(12) United States Patent
Garrett et al.

(10) Patent No.: US 10,587,487 B2
(45) Date of Patent: Mar. 10, 2020

(54) SELECTING TIME-SERIES DATA FOR INFORMATION TECHNOLOGY (IT) OPERATIONS ANALYTICS ANOMALY DETECTION

(71) Applicant: International Business Machines Corporation, Armonk, NY (US)

(72) Inventors: Ryan A. Garrett, Toronto (CA); Robert J. McKeown, Newburyport, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 871 days.

(21) Appl. No.: 14/862,395

(22) Filed: Sep. 23, 2015

(65) Prior Publication Data

US 2017/0085448 A1 Mar. 23, 2017

(51) Int. Cl.
*G06F 15/16* (2006.01)
*H04L 12/26* (2006.01)
*H04L 12/24* (2006.01)

(52) U.S. Cl.
CPC .......... *H04L 43/067* (2013.01); *H04L 41/142* (2013.01)

(58) Field of Classification Search
CPC ..................................... H04L 43/067
USPC ........................................ 709/224
See application file for complete search history.

(56) References Cited

U.S. PATENT DOCUMENTS 7,831,464 B1   11/2010  Nichols et al.
8,090,592 B1 *  1/2012  Goodall ............... G06Q 10/063
                                                              705/2
8,458,090 B1    6/2013  Batra et al.
2006/0276995 A1* 12/2006  Breitgand ............... H04L 41/00
                                                              702/179
2009/0248722 A1 10/2009  Pikovsky
(Continued)

FOREIGN PATENT DOCUMENTS

WO        2014200458        12/2014

OTHER PUBLICATIONS

D.R. Cox and E.J. Snell, "Analysis of Binary Data", 1989, Routledge (Year: 2018).*

(Continued)

*Primary Examiner* — Kevin T Bates
*Assistant Examiner* — Clarence D McCray
(74) *Attorney, Agent, or Firm* — Cantor Colburn LLP; Alexander Jochym (57) ABSTRACT

A computer program product for selecting time-series data is provided. The computer program product includes a computer readable storage medium having program instructions embodied therewith. The program instructions are readable and executable by a processing circuit to cause the processing circuit to assemble, by the processing circuit, a set of analytic assessment tools for time-series data, engage, by the processing circuit, the analytic assessment tools to measure characteristics-of-importance in a relevant analytic domain for sets of the time-series data, generate, by the processing circuit, as a measurement result, a score for each set of the time-series data based on the associated characteristics-of-importance and rank, by the processing circuit, the sets of the time-series data in accordance with the score for each set of the time-series data for subsequent time-series data selection.

11 Claims, 4 Drawing Sheets

(56) References Cited

U.S. PATENT DOCUMENTS

| | | | |
|---|---|---|---|
| 2012/0051642 A1 | 3/2012 | Berrani et al. | |
| 2013/0110761 A1* | 5/2013 | Viswanathan | G06N 20/00 |
| | | | 706/52 |
| 2013/0151907 A1 | 6/2013 | Nakagawa | |
| 2013/0166572 A1* | 6/2013 | Fujimaki | G06Q 10/00 |
| | | | 707/748 |
| 2014/0280142 A1 | 9/2014 | Wasson | |
| 2015/0088606 A1* | 3/2015 | Tyagi | G06Q 30/0202 |
| | | | 705/7.31 |
| 2016/0062950 A1* | 3/2016 | Brodersen | G06F 17/18 |
| | | | 702/181 |
| 2016/0103838 A1 | 4/2016 | Sainani et al. | |
| 2016/0147585 A1* | 5/2016 | Konig | G06F 11/3419 |
| | | | 714/37 |

OTHER PUBLICATIONS

Agee et al., "Method and system for robust secure, and high-efficiency voice and packet transmission over ad-hoc, mesh, and MIMO Communication Networks", Oct. 20, 2015, Comcast Cable Communications (Year: 2015).*

List of IBM Patents or Patent Applications Treated as Related; (Appendix P), Filed Jan. 11, 2016; 2 pages.

Anthony T. Brew, et al., "Selecting Key Performance Indicators for Anomaly Detection Analytics", U.S. Appl. No. 14/929,982, filed Nov. 2, 2015.

IEEE "A Simple Iterative Gaussian Detector for Severely Delay Spread MIMO Channels", Browse Conferences > Communications, 2007. ICC '07., pp. 1-13 (Year:2007).

* cited by examiner

SELECTING TIME-SERIES DATA FOR INFORMATION TECHNOLOGY (IT) OPERATIONS ANALYTICS ANOMALY DETECTION

BACKGROUND

The present invention relates to time-series data selection and, more specifically, to time-series data selection for use in detecting anomalies in information technology (IT) operations analytics.

When analytics systems focusing on analyses of time-series data are deployed in an IT environment, an early step in the deployment and configuration of such systems is the selection of a subset of data that will work well or be suitable for a given type of analysis from the available data. For example, when an analytic tool to retrieve and analyze data from a IT performance management system is deployed, the administrator or user responsible for the deployment may be required to explicitly select which tables of data to export (if they are contained within a database) or to specify which data to export.

In general though, what works well and provides the best possible results in one situation versus another situation is highly dependent on the actual analytic algorithms that are deployed but the administrators or users that are charged with the deployment and the configurations may have no real sense of what data should be selected. Thus a common approach to system deployment and configuration is based simply upon the notion of "best practices" in which previous experience and heuristics are codified in documentation which provide recommendations on which metrics to process. A variation on this theme is one where code and configurations to extract data are organized in deployable packages/packs that can be deployed together.

SUMMARY

According to an embodiment of the present invention, a computer program product for selecting time-series data is provided. The computer program product includes a computer readable storage medium having program instructions embodied therewith. The program instructions are readable and executable by a processing circuit to cause the processing circuit to assemble, by the processing circuit, a set of analytic assessment tools for time-series data, engage, by the processing circuit, the analytic assessment tools to measure characteristics-of-importance in a relevant analytic domain for sets of the time-series data, generate, by the processing circuit, as a measurement result, a score for each set of the time-series data based on the associated characteristics-of-importance and rank, by the processing circuit, the sets of the time-series data in accordance with the score for each set of the time-series data for subsequent time-series data selection.

According to another embodiment of the present invention, a computer program product for selecting time-series data is provided and includes a computer readable storage medium having stored thereon first program instructions executable by a processing circuit to cause the processing circuit to assemble a set of analytic assessment tools for time-series data, second program instructions executable by the processing circuit to cause the processing circuit to engage the analytic assessment tools to measure characteristics-of-importance in a relevant analytic domain for sets of the time-series data, third program instructions executable by the processing circuit to cause the processing circuit to generate, as a measurement result, a score for each set of the time-series data based on the associated characteristics-of-importance and fourth program instructions executable by the processing circuit to cause the processing circuit to rank the sets of the time-series data in accordance with the score for each set of the time-series data for subsequent time-series data selection.

According to yet another embodiment of the present invention, a computer-implemented method for selecting time-series data is provided and includes assembling a set of analytic assessment tools for time-series data, engaging the analytic assessment tools to measure characteristics-of-importance in a relevant analytic domain for sets of the time-series data, generating, as a measurement result, a score for each set of the time-series data based on the associated characteristics-of-importance and ranking the sets of the time-series data in accordance with the score for each set of the time-series data for subsequent time-series data selection.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Deploying and configuring analytics systems can be problematic due to the fact that best practices for the same are limited to being attuned to conditions that have already been seen before multiple times and the fact that this limitation may be most acute at the early stages of the analytic product lifecycle. Other problems include the fact that applicability of best practices depends on the dynamics of a given environment since what worked well in one environment sometimes will not work well in another environment and the fact that the applicability of best practices changes with algorithm changes and, depending on the dynamics of the environment, they may not apply or become tedious to update in any effect.

Therefore, the description provided below relates to an approach to quickly analyze actual data in source systems and to determine a set of acceptable metrics or metric types based upon what algorithms have been deployed. This set of acceptable metrics should then be presented to an administrator or user so that the administrator or user is given an opportunity to select which ones of the set of acceptable metrics should be processed and which ones should be ignored. The motivation for the user selection would be that there are additional selection criteria beyond the notion of "what works well with the algorithm," which should be or must be considered. For example, the administrator or the user may want to give particular consideration towards concerns of computing resources, scalability and customer interest.

The approach effectively combines a method for assessing/scoring time-series against a variety of criteria (e.g. data completeness, presence of particular frequency components, etc.), computing a weighted score for each time-series in the data source and then presenting to the administrator or user the time-series ordered by this ranking for selection. The assessment/scoring schemes themselves may be independently derivable or otherwise produced by algorithm developers. In any case, through the application of the appropriate time-series assessment/scoring schemes, individual time-series/metric types can be classified as "acceptable" or "unacceptable." This would be a two stage process that would first do a cursory search on a small time window to determine if the data should be considered for analytics, with the second stage expanding the time window and focusing on the data that was deemed valuable.

Figure 1:
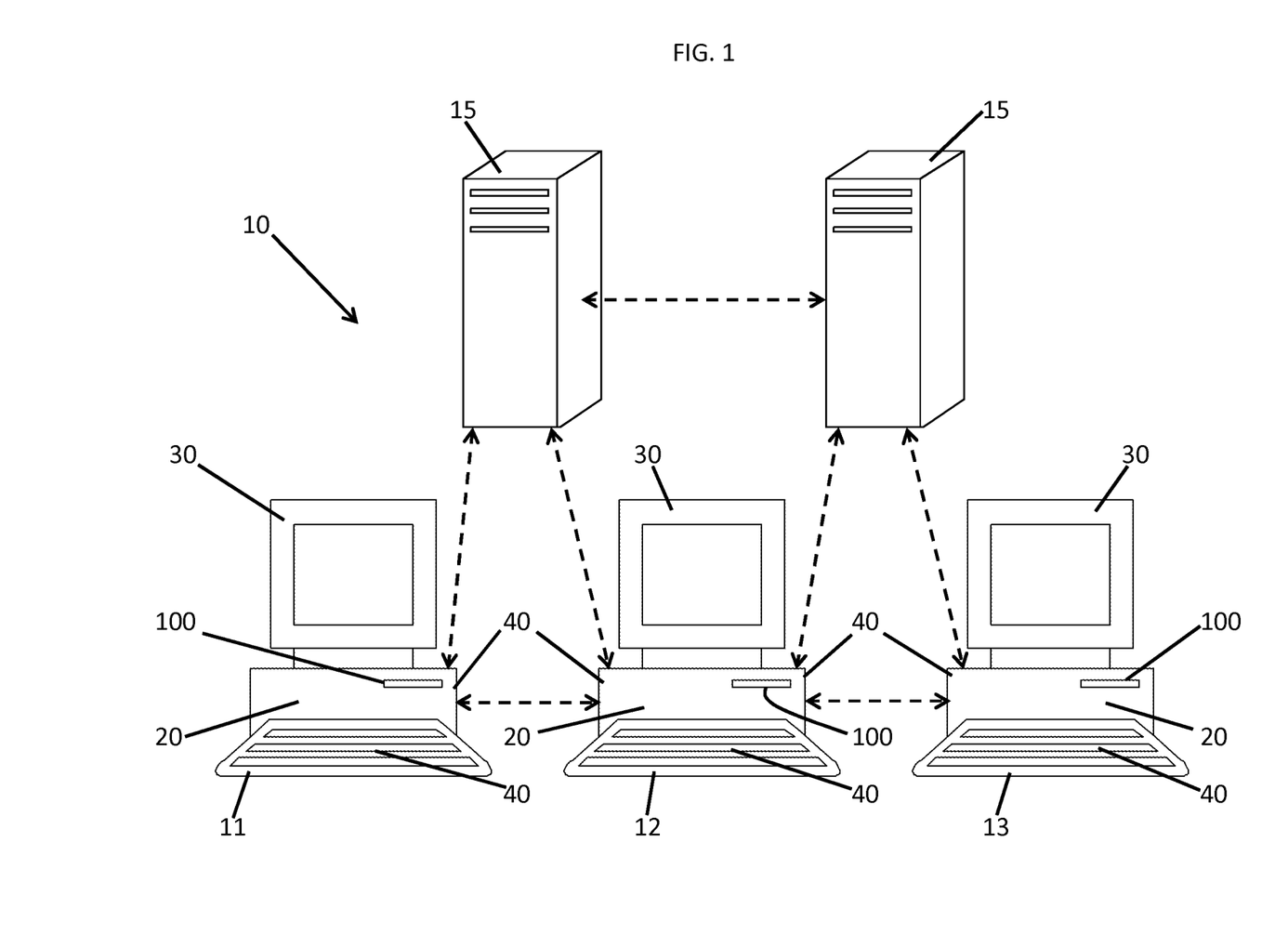
FIG. 1 is a schematic diagram of a computing system in accordance with embodiments.

With reference to FIG. 1, a computing system 10 is provided and may be configured for example as an enterprise computing system or as a personal computing system. In either case, the computing system 10 includes multiple computing devices 11, 12, 13, etc., which are configured to be networked together for communication purposes. Each of the multiple computing devices 11, 12, 13, etc., includes among other features a processing circuit 20, a display 30, user input devices 40 and a networking unit 50 as well as a computer program product 100 for selecting time-series data. The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit 50 may be provided as an Ethernet or other suitable networking device by which the multiple computing devices 11, 12, 13, etc. are communicative.

Figure 2:
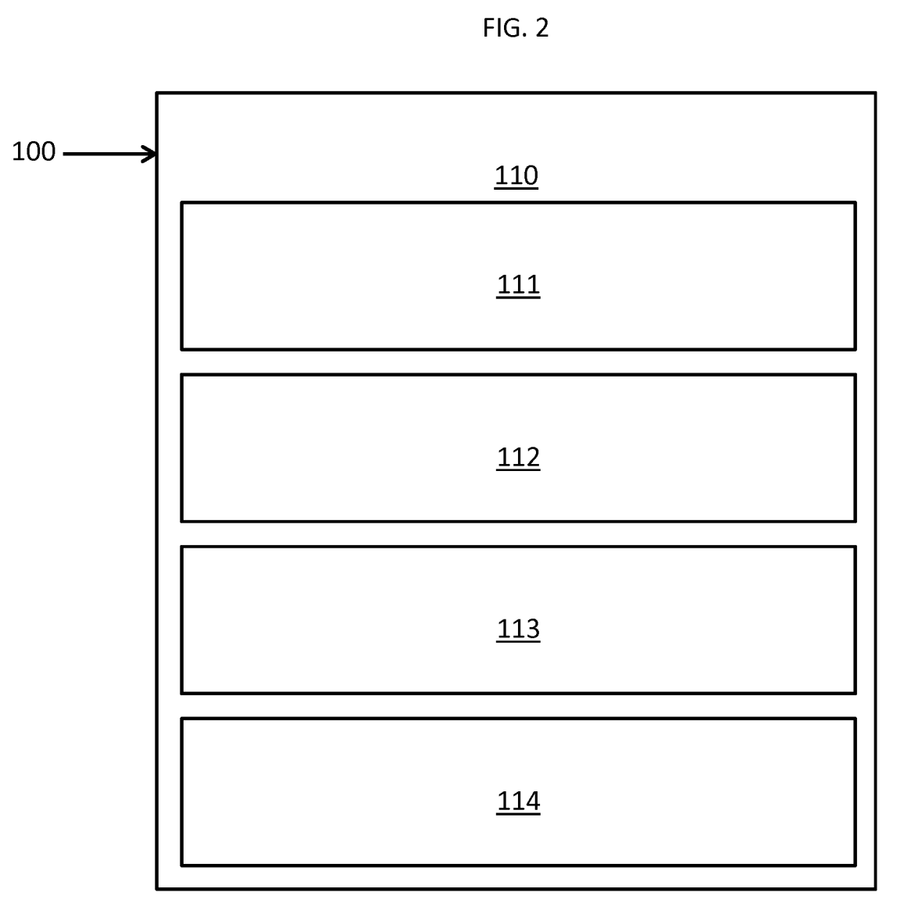
FIG. 2 is a schematic diagram of a computer program product of the computing system of FIG. 1 in accordance with embodiments.

With reference to FIG. 2, the computer program product 100 includes a computer readable storage medium 110 having first, second, third and fourth program instructions 111, 112, 113 and 114 stored thereon. The first program instructions 111 are executable by the processing circuit 20 of each of the multiple computing devices 11, 12, 13, etc., to cause the processing circuit 20 to assemble a set of analytic assessment tools, such as analytic assessment algorithms and functions, or "time-series scorers" for analyzing time-series data. The second program instructions 112 are executable by the processing circuit 20 to cause the processing circuit 20 to engage the analytic assessment tools to measure characteristics-of-importance in a relevant analytic domain for sets of the time-series data. The relevant analytic domain may refer, for example, to information technology (IT) operations analytics, data completeness analytics and frequency/power/spectrum analytics. The third program instructions 113 are executable by the processing circuit 20 to cause the processing circuit 20 to generate, as a measurement result, a score for each set of the time-series data based on the associated characteristics-of-importance and, in some cases, external data. This external data may be, for example, meta-data relating to the sets of the time-series data such as the source of the time-series data and a customer name. The fourth program instructions 114 are executable by the processing circuit 20 to cause the processing circuit 20 to rank the sets of the time-series data in accordance with the score for each set of the time-series data for subsequent time-series data selection.

As defined herein, the characteristics-of-importance may include, but are not limited to, data completeness. That is, the second program instructions 112 may be executable by the processing circuit 20 to cause the processing circuit 20 to engage the analytic assessment tools to measure whether a predefined percentage of expected data is/was present for a given time-series over a given window of time.

In accordance with embodiments, the third program instructions 113 may be configured to cause the processing circuit 20 to combine multiple scores for each set of the time series data to thereby generate an overall score. Such combining may be executed by the processing circuit 20 by way of a linear combination of each of the multiple scores with numerical weighting or by way of a binary combination of each of the multiple scores (for a binary combination, one approach is that, for a time-series, if any of the characteristics-of-importance exceed a specified level for that characteristic, then that time-series would be given a score of '1', meaning 'could be included' such that the binary scoring is typical of the first phase where we are looking for candidates to include—whether it is actually included, depends on subsequent scoring based upon analyzing a fuller set of data and for other key characteristics-of-interest). In the latter case, a score of "X" as a user configurable threshold would be required for a given set of the time-series data to be included in eventual analytics.

In accordance with further embodiments, the fourth program instructions 114 cause the processing circuit 20 to include higher ranked sets of the time-series data in eventual analytics. In doing so, the fourth program instructions 114 may cause the processing circuit to 20 include sets of the time-series data having scores that are above a predefined threshold in the eventual analytics and reject sets of the time-series data having scores that are below the predefined threshold.

The ranking of the sets of the time-series data may be provided as a two-phase or two-step process. In such cases, the initial (optional) phase may be executed as a scoring phase in which a relatively small time sample of data is examined and characteristics-of-interest are measured so that the results of the examination and measurement can be analyzed using binary or weighted-combinations to arrive at an initial score. In this first phase, a candidate subset is identified based upon essential criteria and is determined to be present in sufficient strength for inclusion in the subsequent analytics. The second (characterization) phase follows where there may be fewer numbers of sets of time-series data to be examined but those sets of time-series data that remain would be across a wider range of times such that a single stage process would otherwise be computationally expensive. The combination of scores for the characteristics-of-interest of the second phase leads to the scores used for selection when exceeding configured thresholds or ranking.

While it is understood that the first, second, third and fourth program instructions 111, 112, 113 and 114 may be deployed by manual loading thereof directly into a client, server and/or proxy computer by way of a loadable storage medium, such as a CD, DVD, etc., being manually inserted into each of the multiple computing devices 11, 12, 13, etc., the first, second, third and fourth program instructions 111, 112, 113 and 114 may also be automatically or semi-automatically deployed into the computing system 10 by way of a central server 15 or a group of central servers 15 (see FIG. 1). In such cases, the first, second, third and fourth program instructions 111, 112, 113 and 114 may be downloadable into client computers that will then execute the first, second, third and fourth program instructions 111, 112, 113 and 114.

In accordance with alternative embodiments, the first, second, third and fourth program instructions 111, 112, 113 and 114 may be sent directly to a client system via e-mail with the first, second, third and fourth program instructions 111, 112, 113 and 114 then being detached to or loaded into a directory. Another alternative would be that the first, second, third and fourth program instructions 111, 112, 113 and 114 be sent directly to a directory on a client computer hard drive. When there are proxy servers, however, loading processes will select proxy server codes, determine on which computers to place the proxy servers' codes, transmit the proxy server codes and then install the proxy server codes on proxy computers. The first, second, third and fourth program instructions 111, 112, 113 and 114 will then be transmitted to the proxy server and subsequently stored thereon.

Figure 3:
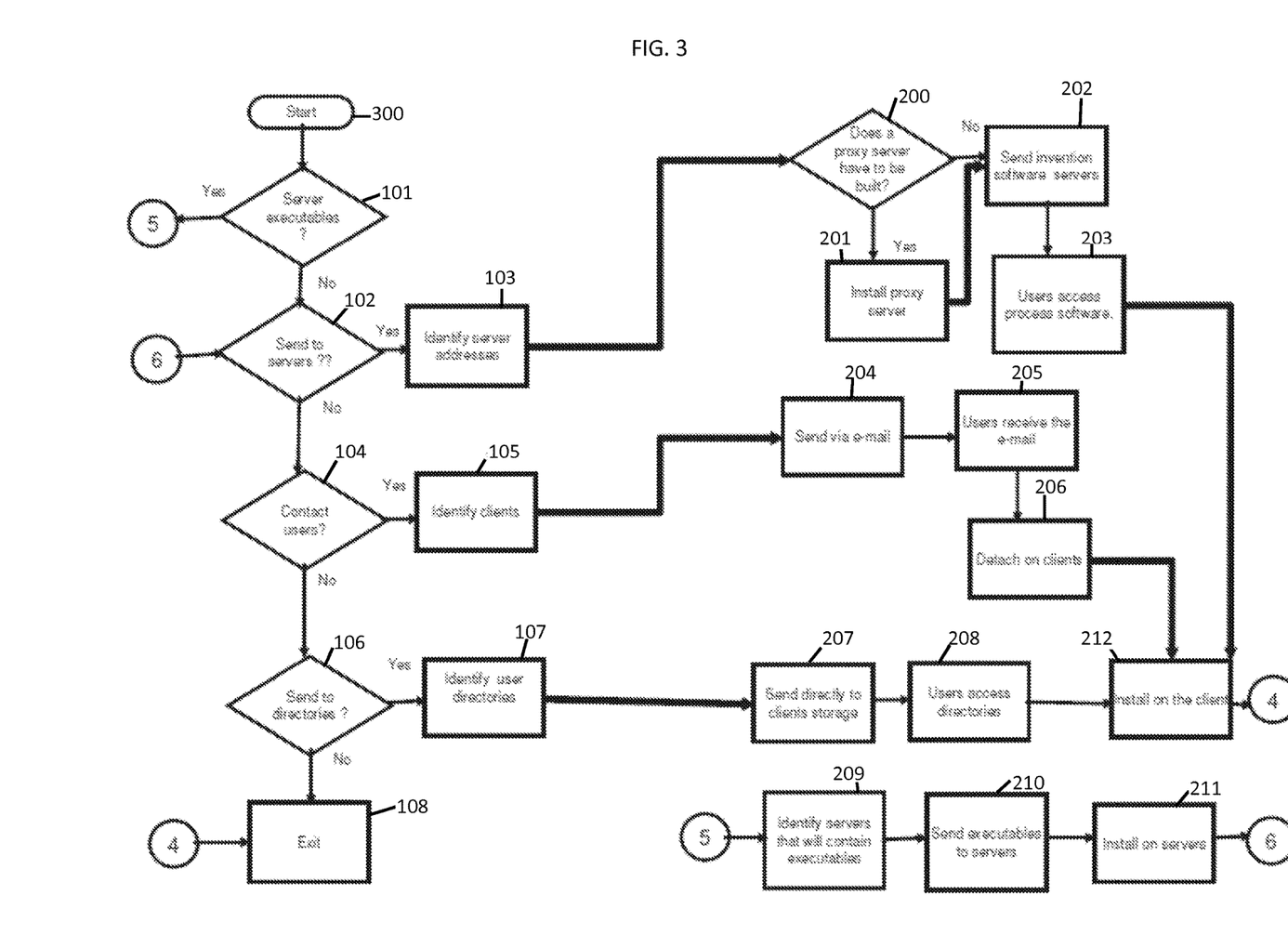
FIG. 3 is a flow diagram illustrating a deployment process for the computer program product of FIG. 2 in accordance with embodiments.

In accordance with embodiments and, with reference to FIG. 3, a deployment process of the computer program product described above is provided. The process begins at block 300 and at block 101 with a determination of whether the first, second, third and fourth program instructions 111, 112, 113 and 114 will reside on a server or servers when executed. If so, then the servers that will contain the executables are identified at block 209. The first, second, third and fourth program instructions 111, 112, 113 and 114 for the server or servers are then transferred directly to the servers' storage via FTP or some other protocol or by copying though the use of a shared file system at block 210 such that the first, second, third and fourth program instructions 111, 112, 113 and 114 are installed on the servers at block 211.

Next, a determination is made on whether the first, second, third and fourth program instructions 111, 112, 113 and 114 are to be deployed by having users access the first, second, third and fourth program instructions 111, 112, 113 and 114 on a server or servers at block 102. If so, the server addresses that will store the first, second, third and fourth program instructions 111, 112, 113 and 114 are identified at block 103 and a determination is made if a proxy server is to be built at block 200 to store the first, second, third and fourth program instructions 111, 112, 113 and 114. A proxy server is a server that sits between a client application, such as a Web browser, and a real server and operates by intercepting all requests to the real server to see if it can fulfill the requests itself. If not, the proxy server forwards the request to the real server. The two primary benefits of a proxy server are to improve performance and to filter requests.

If a proxy server is required, then the proxy server is installed at block 201 and the first, second, third and fourth program instructions 111, 112, 113 and 114 are sent to the (one or more) servers via a protocol, such as FTP, or by being copied directly from the source files to the server files via file sharing at block 202. Another embodiment involves sending a transaction to the (one or more) servers that contained the process software, and have the server process the transaction and then receive and copy the process software to the server's file system. Once the process software is stored at the servers, the users may then access the first, second, third and fourth program instructions 111, 112, 113 and 114 on the servers and copy to the same to their respective client computer file systems at block 203. Alternatively, the servers may automatically copy the first, second, third and fourth program instructions 111, 112, 113 and 114 to each client and then run an installation program for the first, second, third and fourth program instructions 111, 112, 113 and 114 at each client computer whereby the user executes the program that installs the first, second, third and fourth program instructions 111, 112, 113 and 114 on his client computer at block 212 and then exits the process at block 108.

At block 104, a determination is made as to whether the first, second, third and fourth program instructions 111, 112, 113 and 114 are to be deployed by sending the first, second, third and fourth program instructions 111, 112, 113 and 114 to users via e-mail. If a result of the determination is affirmative, the set of users where the first, second, third and fourth program instructions 111, 112, 113 and 114 will be deployed are identified together with the addresses of the user client computers at block 105 and the first, second, third and fourth program instructions 111, 112, 113 and 114 are sent via e-mail to each of the users' client computers. The users then receive the e-mail at block 205 and then detach the first, second, third and fourth program instructions 111, 112, 113 and 114 from the e-mail to a directory on their client computers at block 206. The user executes the program that installs the first, second, third and fourth program instructions 111, 112, 113 and 114 on his client computer at block 212 and then exits the process at block 108.

Lastly, a determination is made on whether the first, second, third and fourth program instructions 111, 112, 113 and 114 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the first, second, third and fourth program instructions 111, 112, 113 and 114 at block 208, execute the program that installs the first, second, third and fourth program instructions 111, 112, 113 and 114 at block 212 and then exit the process at block 108.

Figure 4:
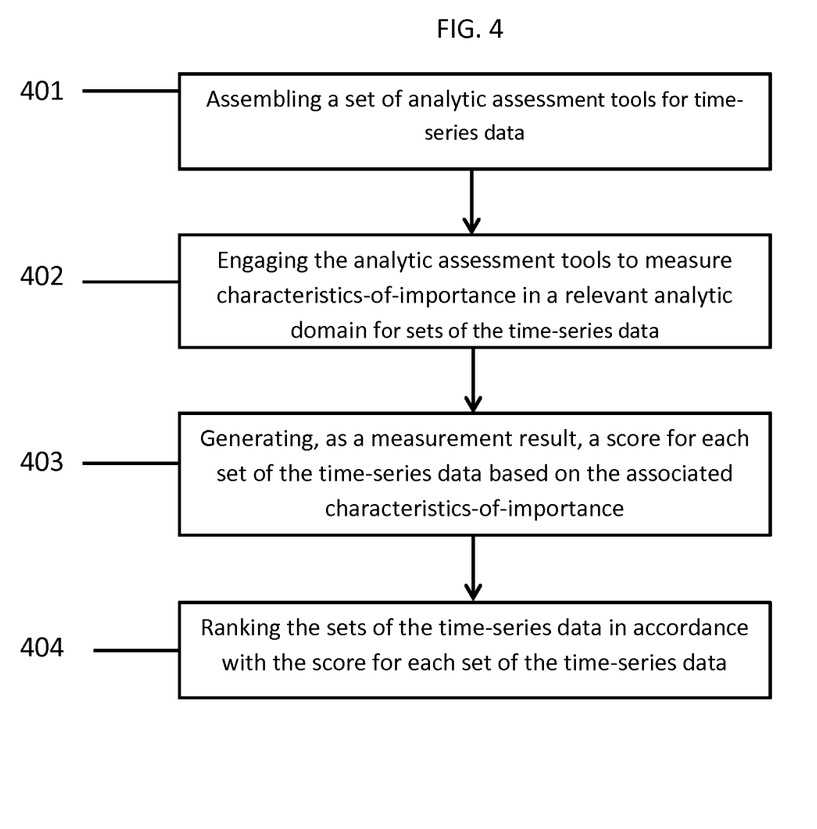
FIG. 4 is a flow diagram illustrating a computer-implemented method of selecting time-series data in accordance with embodiments.

With reference to FIG. 4, a method for selecting time-series data is provided. The method includes assembling a set of analytic assessment tools for time-series data, as shown at block 401, engaging the analytic assessment tools to measure characteristics-of-importance in a relevant analytic domain for sets of the time-series data, as shown at block 402, generating, as a measurement result, a score for each set of the time-series data based on the associated characteristics-of-importance, as shown at block 403 and as described above, and ranking the sets of the time-series data in accordance with the score for each set of the time-series data for subsequent time-series data selection, as shown at block 404 and as described above.

A potential use of the computer program product and the method described above would, in some cases, be to generate point tooling or "data mediation tooling" at potential data sources and data bases and, for time-series data stored therein, to analyze the time-series data and to present ranked lists to users for inclusion or exclusion with respect to downstream analysis. As noted above, aspects of the disclosure can be automated whereby, for example, only time-series data scoring above a certain level might be flagged for subsequent inclusion in downstream analysis. Moreover, users will have an opportunity to adjust weighting values assigned to various factors and to build upon those supplied by a pre-existing development team. For example, the user may decide that particular time-series data very directly measures key customer experience aspects and are more important to include in downstream analytics then the corresponding score might otherwise indicate. Here, an example of a binary score would be if the time-series is directly associated with customer experience measurements (e.g., it is a well-known metric type), it may automatically be scored/flagged for inclusion based upon the best practice.

Advantages associated with the computer program product and method described above include, but are not limited to, the fact that the features described herein can work without explicit notions of 'best-practices' or pre-existing lists of metrics since important factors that are generally included in the creation of such best-practices or lists are codified within the time series scoring mechanisms. Thus, from day 1 of a product deployment, data selection can be explicitly facilitated and can deal with vagaries of a particular environment (i.e., where a metric type X, based upon observation and analysis, is determined to be acceptable in one environment but would not be in another). In addition, administrators or users of the computer program product and method will be able to select the top-N sets of the time-series data and have confidence that the set is a "best" fit for a given case.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for selecting time-series data, the computer program product comprising a computer readable storage medium having program instructions embodied therewith, the program instructions being readable and executable by a processing circuit to cause the processing circuit to:
    assemble, by the processing circuit, a set of analytic assessment tools for time-series data;
    engage, by the processing circuit, the analytic assessment tools to measure characteristics-of-importance in a relevant analytic domain for sets of the time-series data;
    generate, by the processing circuit, as a measurement result, a score for each set of the time-series data based on the associated characteristics-of-importance; and
    rank, by the processing circuit, the sets of the time-series data in accordance with the score for each set of the time-series data for subsequent time-series data selection,
    wherein the program instructions cause the processing circuit to combine multiple scores for each set of the time series data to generate an overall score and the combining by the processing circuit comprises binary combining of each of the multiple scores where, for a time-series, if any of the characteristics-of-importance exceed a specified level for that characteristic, then that time-series receives a '1' score and is subject to subsequent scoring based on an analysis of a fuller data set.

2. The computer program product according to claim 1, wherein the program instructions cause the processing circuit to generate the score based on the associated characteristics-of-importance and external data.

3. The computer program product according to claim 1, wherein the program instructions cause the processing circuit to include higher ranked sets of the time-series data in an eventual analytics.

4. The computer program product according to claim 3, wherein the program instructions cause the processing circuit to:
    include sets of the time-series data having scores that are above a predefined threshold in the eventual analytics; and
    reject sets of the time-series data having scores that are below the predefined threshold.

5. A computer program product for selecting time-series data, the computer program product comprising:
    a computer readable storage medium having stored thereon:
    first program instructions executable by a processing circuit to cause the processing circuit to assemble a set of analytic assessment tools for time-series data;
    second program instructions executable by the processing circuit to cause the processing circuit to engage the analytic assessment tools to measure characteristics-of-importance in a relevant analytic domain for sets of the time-series data;
    third program instructions executable by the processing circuit to cause the processing circuit to generate, as a measurement result, a score for each set of the time-series data based on the associated characteristics-of-importance; and
    fourth program instructions executable by the processing circuit to cause the processing circuit to rank the sets of the time-series data in accordance with the score for each set of the time-series data for subsequent time-series data selection,
    wherein the third program instructions cause the processing circuit to combine multiple scores for each set of the time series data to generate an overall score and the combining by the processing circuit comprises binary combining of each of the multiple scores where, for a time-series, if any of the characteristics-of-importance exceed a specified level for that characteristic, then that time-series receives a '1' score and is subject to subsequent scoring based on an analysis of a fuller data set.

6. The computer program product according to claim 5, wherein the third program instructions cause the processing circuit to generate the score based on the associated characteristics-of-importance and external data.

7. The computer program product according to claim 5, wherein the fourth program instructions cause the processing circuit to include higher ranked sets of the time-series data in an eventual analytics.

8. The computer program product according to claim 7, wherein the fourth program instructions cause the processing circuit to:
include sets of the time-series data having scores that are above a predefined threshold in the eventual analytics; and
reject sets of the time-series data having scores that are below the predefined threshold.

9. A computer-implemented method for selecting time-series data, comprising:
assembling, by a processor, a set of analytic assessment tools for time-series data;
engaging the analytic assessment tools to measure characteristics-of-importance in a relevant analytic domain for sets of the time-series data;
generating, as a measurement result, a score for each set of the time-series data based on the associated characteristics-of-importance; and
ranking the sets of the time-series data in accordance with the score for each set of the time-series data for subsequent time-series data selection,
wherein the method further comprises combining multiple scores for each set of the time series data to generate an overall score,
the combining comprising binary combining of each of the multiple scores where, for a time-series, if any of the characteristics-of-importance exceed a specified level for that characteristic, then that time-series receives a '1' score and is subject to subsequent scoring based on an analysis of a fuller data set.

10. The computer-implemented method according to claim 9, wherein the generating comprises generating the score based on the associated characteristics-of-importance and external data.

11. The computer-implemented method according to claim 9, further comprising:
including higher ranked sets of the time-series data in an eventual analytics;
including sets of the time-series data having scores that are above a predefined threshold in the eventual analytics; and
rejecting sets of the time-series data having scores that are below the predefined threshold.

* * * * *